United States Patent [19]
Burst et al.

[11] Patent Number: 4,956,979
[45] Date of Patent: Sep. 18, 1990

[54] HEATING AND/OR AIR-CONDITIONING SYSTEM FOR A MOTOR VEHICLE

[75] Inventors: Hermann Burst, Rutesheim; Klaus-Roger Düwel, Marbach; Ulrich Scheyhing, Winnenden; Walter Pross, Sindelfingen; Horst Petri, Hemmingen, all of Fed. Rep. of Germany

[73] Assignee: Ing. h.c.F. Porsche AG, Fed. Rep. of Germany

[21] Appl. No.: 387,532

[22] Filed: Jul. 31, 1989

[30] Foreign Application Priority Data

Jul. 30, 1988 [DE] Fed. Rep. of Germany ....... 3826021

[51] Int. Cl.$^5$ .............................................. B60H 1/32
[52] U.S. Cl. ........................................ 62/244; 62/272; 98/2.10; 98/2.19
[58] Field of Search .................... 62/239, 244, 272; 98/2.1, 2.19

[56] References Cited

U.S. PATENT DOCUMENTS

| | | | |
|---|---|---|---|
| 2,016,019 | 10/1935 | Muvrin | 98/2.1 X |
| 3,498,076 | 3/1970 | Michael | 62/244 |
| 3,616,871 | 11/1971 | West | 98/2.19 X |
| 3,926,000 | 12/1975 | Scofield | 62/244 |
| 4,051,692 | 10/1977 | Ku et al. | 62/244 |
| 4,412,425 | 11/1983 | Fukami et al. | 62/244 |
| 4,768,349 | 9/1988 | Lin et al. | 62/244 X |

*Primary Examiner*—Lloyd L. King
*Attorney, Agent, or Firm*—Evenson, Wands, Edwards, Lenahan & McKeown

[57] ABSTRACT

In a heating and/or air-conditioning system for a motor vehicle, which has a first drain for rain and washing water and a second drain for the condensation water forming in the area of the evaporator, it is provided that both drains, at least in part, are integrated, specifically separate from one another, into the housing of the heating and/or air-conditioning system.

13 Claims, 5 Drawing Sheets

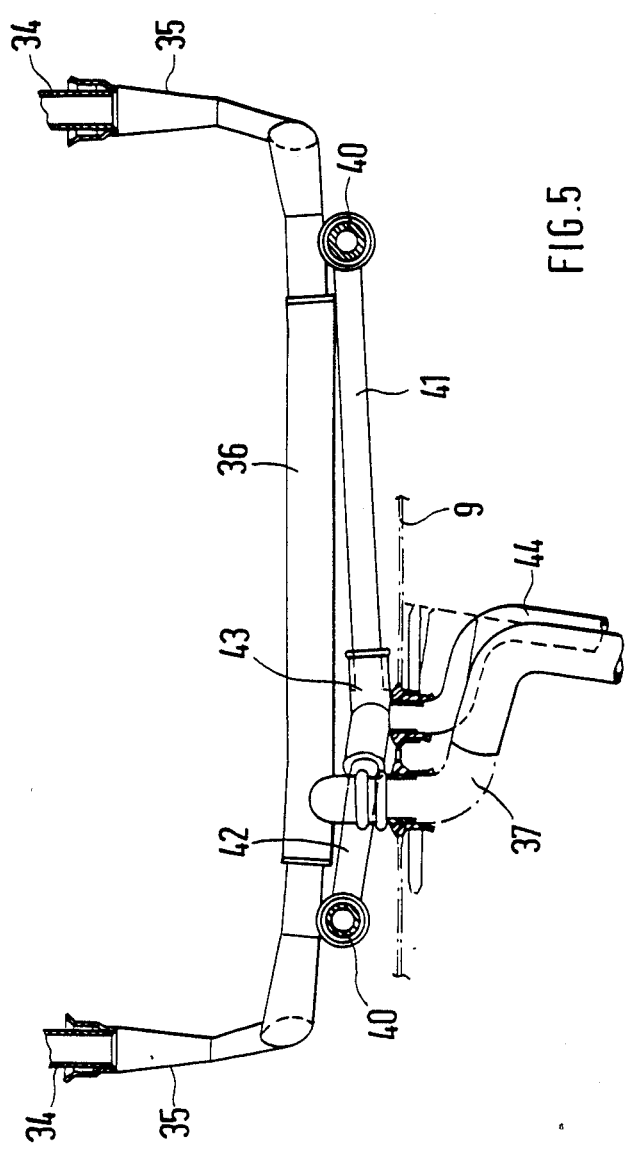

HEATING AND/OR AIR-CONDITIONING SYSTEM FOR A MOTOR VEHICLE

BACKGROUND AND SUMMARY OF THE INVENTION

The invention relates to a heating and/or air-conditioning system for a motor vehicle having a housing containing an evaporator and a fan, having an inflow duct for fresh air, a first drain for the entering rain and washing water, and a second drain for the condensation water forming in the area of the evaporator, the fresh air, by way of an inlet opening arranged adjacent to a windshield, reaching the inflow duct.

German Published Unexamined Patent Application (DE-OS) No. 36 19 935 discloses a heating and/or air-conditioning system for a motor vehicle, in which a first water drain developed on the body side is provided for the rain water or washing water entering through the inflow duct for fresh air, and a second water drain developed on the housing side is provided for the carrying-away of the condensation water forming in the area of the evaporator.

This arrangement has the disadvantage that for the rain and washing water drain on the body side extensive measures must be taken (separate water box underneath the windshield with a water deflecting device) which result in considerable costs. In addition, the rain and washing water drain requires considerable space in the area of the front end wall of a motor vehicle.

It is an object of the invention to take such measures with respect to a heating and/or air-conditioning system that, with a good functioning and a space-saving arrangement, the manufacturing costs for both water drains can be reduced.

According to the invention, this object is achieved by providing an arrangement wherein at least portions of the two drains are integrated, specifically separately from one another, into the housing of the heating and/or air-conditioning system.

The main advantages achieved by means of preferred embodiment of the invention are that by the integration of the two separate drains into the housing of the heating and/or air-conditioning system, the space required for a heating and/or air-conditioning system is reduced significantly and, at the same time, the manufacturing costs are reduced considerably because the water box on the body side is not required. Expensive welding and sealing work is therefore not necessary in the forward area of the vehicle. As a result of the separate arrangement of both drains, a preliminary precipitation takes place of the rain and washing water entering into the housing of the heating and/or air-conditioning system. This water, for the most part, is collected in front of the evaporator and is discharged to the outside, so that no water drops can reach the interior of the vehicle. The return valve arranged at the free end of the drain for the condensation water has the effect that, despite the arrangement of this drain on the suction side, the accumulated condensation water in the case of a certain water column can flow out to the outside in downward direction.

Other objects, advantages and novel features of the present invention will become apparent from the following detailed description of the invention when considered in conjunction with the accompanying drawings.

BRIEF DESCRIPTION OF THE DRAWINGS

FIG. 5 is a partial view in the direction of arrow R of FIG. 4.

DETAILED DESCRIPTION OF THE DRAWINGS

Figure 1:
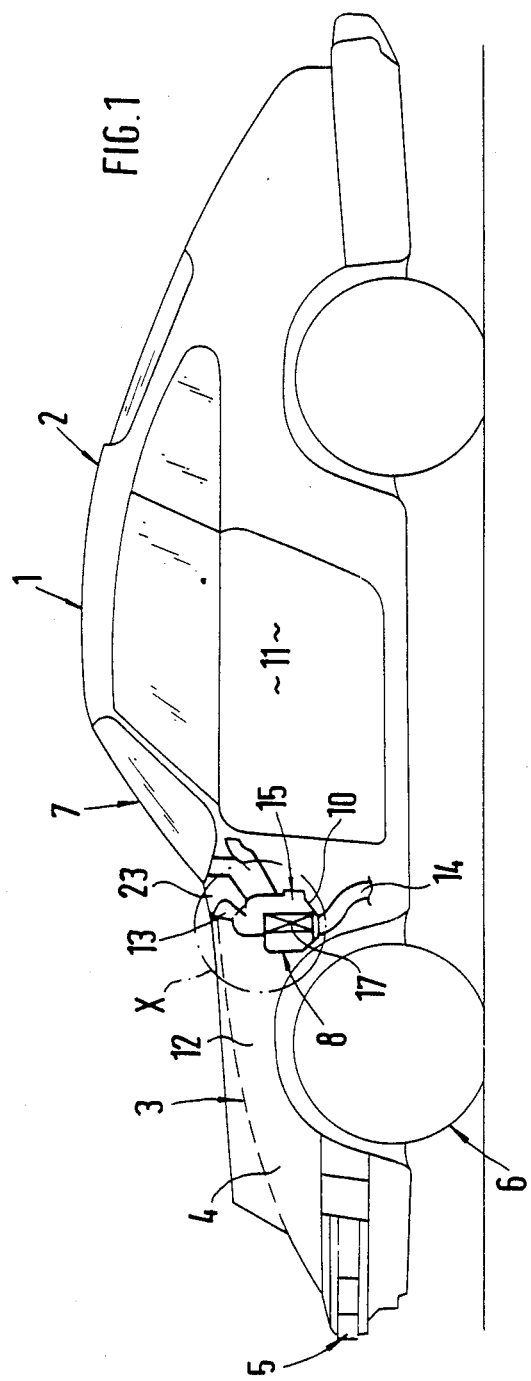
FIG. 1 is a lateral schematic view of a passenger car having a heating and/or air-conditioning system constructed according to a preferred embodiment of the present invention.

A motor vehicle (passenger car) 1 with an air-cooled rear engine, which is not shown in detail, has a body 2 which, in the front end area, is composed of a front opening hood 3, lateral fenders 4, a bumper 5, wheels 6 and a windshield 7. According to FIG. 1, the motor vehicle is equipped with a heating and/or air-conditioning system 8 which comprises a housing 10 fastened to a bulkhead 9 arranged on the body side. The bulkhead 9 separates a vehicle interior 11 from a cargo or installation space 12.

The housing 10 comprises inflow ducts 13, 14, 15 for fresh air, heated air and circulating or cooled air as well as several outlet ducts, which are not shown in detail and which guide the air mixed inside the housing 10 by means of a fan 16 into the leg area, to the central nozzle, to the defroster nozzle and to the side nozzles. Inflow duct 14 is assigned to the heated air and inflow duct 15 is assigned to the circulating air or cooled air.

Figure 2:
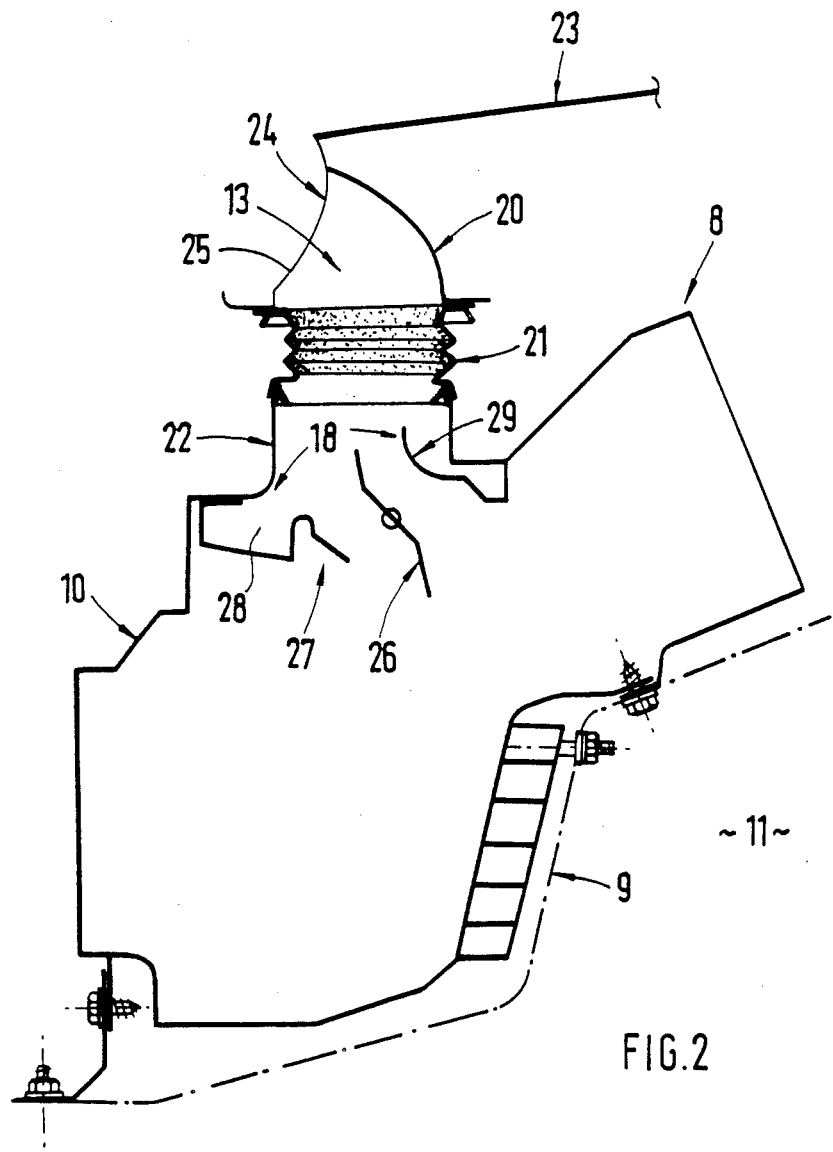
FIG. 2 is an enlarged schematic view of cutout X of FIG. 1.
Figure 3:
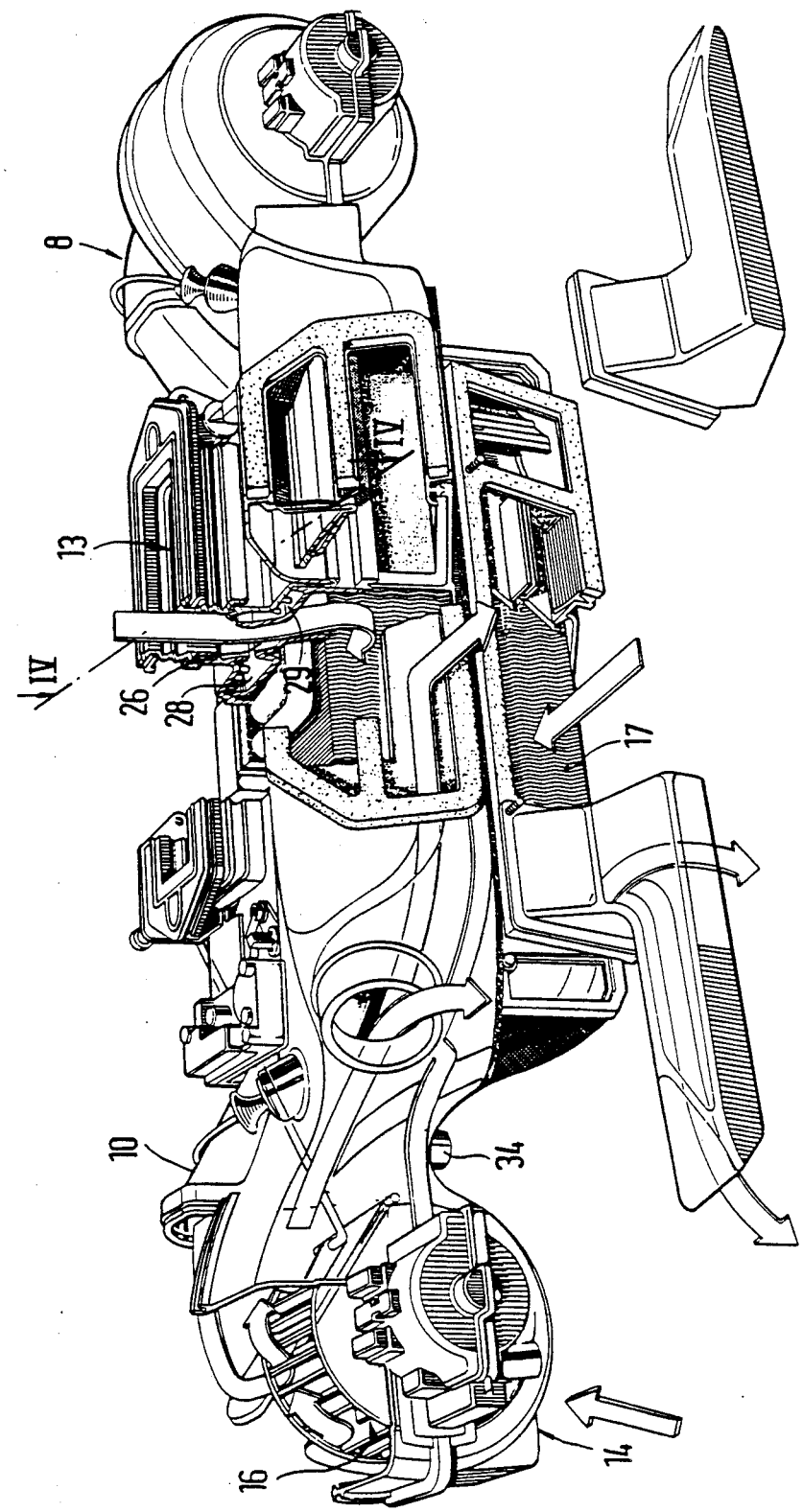
FIG. 3 is a partially sectional diagonal view of the housing of the heating and/or air-conditioning system of FIG. 1 and 2.
Figure 4:
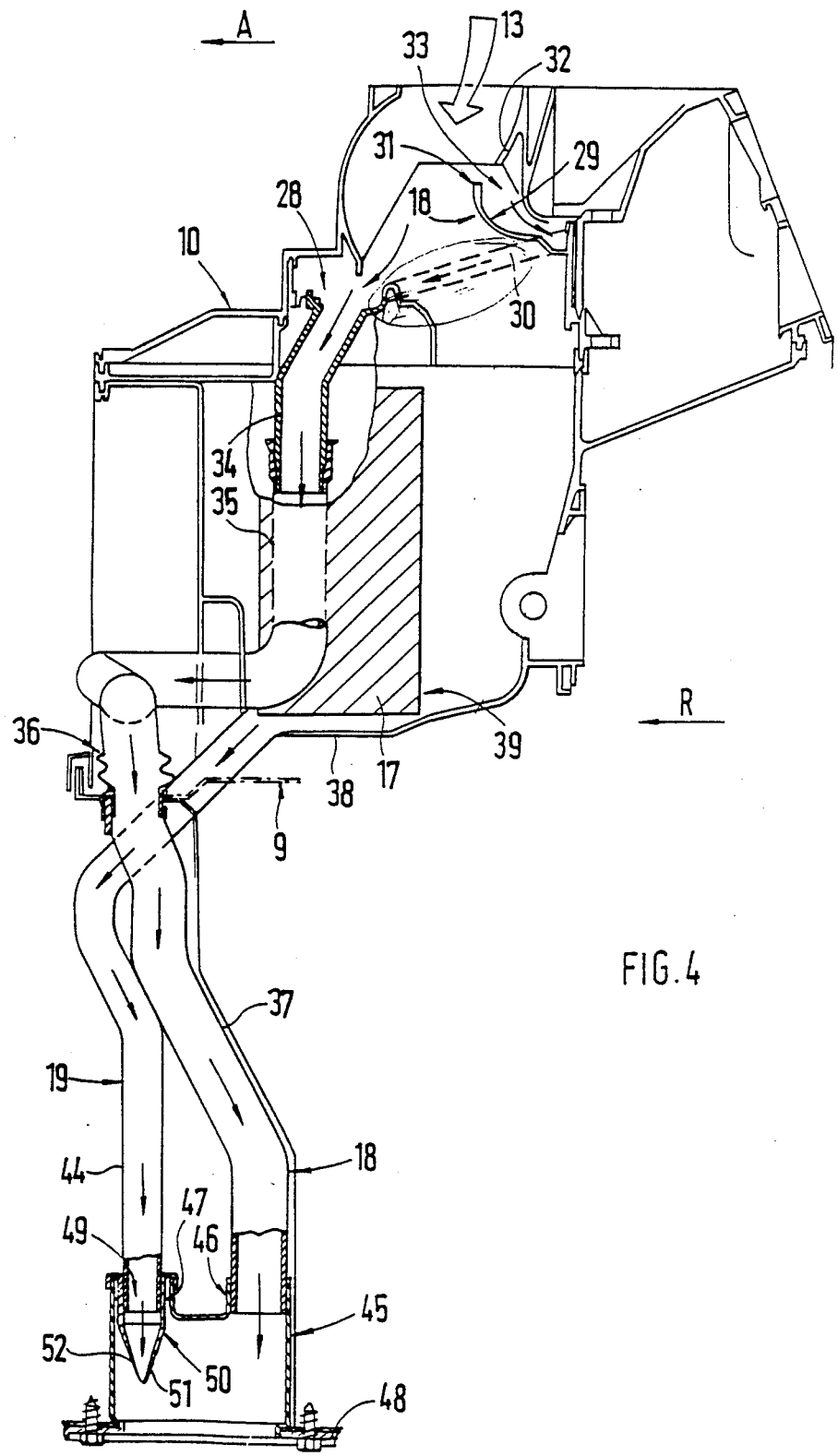
FIG. 4 is a sectional view taken along line IV—IV of FIG. 3 with the two drains for the rain and washing water and for the condensation water.

In addition, an evaporator 17 is arranged inside the housing 10. According to the invention, a first water drain 18 for the rain and washing water flowing in through the inflow duct 13 for the fresh air is integrated into the housing at least in sections, as well as a second water drain 19 for the condensation water forming in the area of the evaporator 17, both water drains 18, 19 being constructed separately from one another at the housing 10 (FIG. 2 and 4).

The first drain 18 for the rain and washing water is connected directly to the inflow duct 13 for the fresh air. The inflow duct 13 for the fresh air is formed by a scoop 20 on the side of the body, this scoop 20 being connected by means of a flexible bellows 21 with a connecting piece 22 of the housing 10 which is located underneath it. The scoop 20 is constructed at a cowl plate 23 arranged at the lower transversely extending edge of the windshield 7 and, on the side facing the front opening hood 3, has an approximately upright extending inlet opening 24 which is covered by an air-permeable grid 25 (FIG. 2). The inlet opening 24 has an approximately rectangular shape. The also rectangular upright extending bellows 21 is detachably connected to the lower end of the scoop 20 and to the upper end of the connecting piece 22. Below and adjacent to the connecting piece 22, a fresh-air flap 26 is provided which interacts with an adjusting motor and by means of which the fresh air supply to the housing 10 is controlled. The closed fresh-air flap 26 is disposed diagonally in the space and, viewed against the driving direction A, rises slightly toward the rear. The approximately central rotating shaft of the fresh-air flap 26 extends in transverse direction of the vehicle and is aligned horizontally. According to FIG. 2, the fresh-air flap 26 is surrounded by a frame-like groove system 27. This groove system 27 consists of a front transverse groove 28, a rear transversely extending collecting groove 29 and two longitudinally directed, laterally outside hollowed sections or wells 30 with approximately U-shaped profiles. The collecting groove 29 is disposed slightly higher than the front transverse groove 28. The free end 31 of the collecting groove 29 is pulled up to a guiding lip 32 of the housing 10 in such a manner that the free end 31, viewed in driving direction A, reaches over the guiding lip 32 in sections. A gap 33 is created between the guiding lip 32 and the collecting groove (FIG. 4).

When the fresh-air flap 26 is closed, the inflowing rain and washing water partially flows to the fresh-air flap 26 and from there is diverted into the front transverse groove 28. The two longitudinally directed wells 30 are aligned approximately in parallel to the diagonally extending closed flap 26.

In the area where the two wells 30 are guided together with the front transverse groove 28, one upright drain piece 34 respectively is molded on which projects in downward direction and to which vertical pipe sections 35 are connected outside the housing 10 (FIG. 5). The two pipe sections 35, by means of a common T-shaped rubber funnel 36, are connected with a central upright draining hose 37. The rubber funnel 36, in a manner not shown in detail, is buttoned into an opening of the bulkhead 9 and is thus fixed on the body side. The front transverse groove 28 and the rear transverse groove 29 as well as the wells 30 extend above the evaporator 17. The front transverse groove 28 and the rear collecting groove 29—viewed in transverse direction—are constructed to be sloping toward the outside so that the entering rain and washing water will automatically flow to the outside drain piece 35.

The second drain 19 at the housing 10 is provided adjacent to the lower area of the evaporator 17. For this purpose, a groove-shaped receiving device 39 having two laterally exterior tube-shaped drain pieces 40 is constructed below the evaporator 17 at the housing bottom 38. Outside the housing 10, transversely extending diagonal pipes 41, 42 are connected to these approximately horizontally aligned drain pieces 40, these pipes 41, 42, by way of a common T-shaped transition piece 43 made of rubber, leading into an additional central drain pipe 44 (FIG. 5). The transition piece 43, in a manner not shown in detail, is also buttoned into an opening of the bulkhead 9 and is therefore held in position on the body side.

Both central drain pipes 37, 44 are directed downward toward the road surface, the free ends of the two drain pipes 37, 44 being fitted into a common plastic container 45. The plastic container 45 is open toward the bottom and, on its top side, has two connection pieces 46, 47 for receiving the drain pipes 37, 44. According to FIG. 4, the plastic container 45 is screwed to a horizontal floor wall 48 of the motor vehicle. The free end 49 of the second drain pipe 44 interacts with a return valve 50. The return valve 50 is closed on the bottom and opens up when the locking pressure of the sealing lips 51, 52 exceeds the force resulting from the water column. Both water drains 18, 19 are arranged outside the passenger compartment 11 so that an entering of water into the passenger compartment 11 becomes impossible. When the fresh-air flap 26 is open, a part of the rain and washing water is intentionally guided through the heater and is diverted to the outside by way of the second drain 19 for the condensation water. The pipe sections 35, 41, 42 arranged outside the housing 10 and the drain pipes 37, 44 of both drains 18, 19 are preferably formed by blown or blow molded plastic pipes.

Although the invention has been described and illustrated in detail, it is to be clearly understood that the same is by way of illustration and example, and is not to be taken by way of limitation.

What is claimed:

1. A heating and/or air-conditioning system for a motor vehicle having a housing containing an evaporator and a fan, having an inflow duct for fresh air, a first drain for the entering rain and washing water, and a second drain for the condensation water forming in the area of the evaporator, the fresh air, by way of an inlet opening arranged adjacent to a windshield, reaching the inflow duct, wherein at least portions of the two drains, at least in sections, are integrated, specifically separately from one another, into the housing of the heating and/or air-conditioning system.

2. A heating and/or air-conditioning system according to claim 1, wherein a portion of the first drain for the rain and washing water extends in the area of the inflow duct for the fresh air.

3. A heating and/or air-conditioning system according to claim 2, wherein the inflow duct for the fresh air is formed by a scoop arranged on the body side adjacent to the inlet opening, this scoop being connected by means of a flexible bellows with a connecting piece of the housing located underneath it.

4. A heating and/or air-conditioning system according to claim 3, wherein the first drain, below the connecting piece of the housing, viewed in driving direction, has a rear transversely extending collecting groove and a front transverse groove, the transverse groove and the collecting groove being connected with one another in lateral exterior areas by means of longitudinally extending wells, and wherein a fresh-air flap for the opening and closing of the inflow duct extends between the two grooves and the wells.

5. A heating and/or air-conditioning system according to claim 4, wherein the rear collecting groove is disposed slightly higher than the front transverse groove.

6. A heating and/or air-conditioning system according to claim 4, wherein, in the area where the diagonally extending wells are guided together with the front transverse groove, one upright drain piece respectively is provided to which a pipe section is connected outside the housing, the two pipe sections being guided together to a central drain pipe by means of a common rubber funnel.

7. A heating and/or air-conditioning system according to claim 1, wherein the second drain is formed by a groove-shaped receiving device arranged at the housing bottom below the evaporator, the receiving device having two laterally exterior drain pieces.

8. A heating and/or air-conditioning system according to claim 7, wherein pipe sections are connected to the two drain pieces, these pipe sections, being connected with a central drain pipe by way of a common transition piece.

9. A heating and/or air-conditioning system according to claim 1, wherein the bottom free ends of the two drains lead into a common plastic container which is open in downward direction.

10. A heating and/or air-conditioning system according to claim 1, wherein a return valve is provided at the free end of the second drain arranged on the suction side with respect to the fan.

11. A heating and/or air-conditioning system according to claim 4, wherein the rear collecting groove and the front transverse groove as well as the longitudinally extending wells extend above the evaporator.

12. A heating and/or air-conditioning system according to claim 6, wherein the pipe sections of the two drains are formed by blown plastic pipes.

13. A heating and/or air-conditioning system according to claim 8, wherein the pipe sections of the two drains are formed by blown plastic pipes.

* * * * *